(12) United States Patent
Li et al.

(10) Patent No.: US 7,224,863 B1
(45) Date of Patent: May 29, 2007

(54) ALL OPTICAL REGENERATION

(75) Inventors: Yuhua Li, Orlando, FL (US); Guifang Li, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 188 days.

(21) Appl. No.: 10/661,184

(22) Filed: Sep. 12, 2003

Related U.S. Application Data

(60) Provisional application No. 60/410,110, filed on Sep. 12, 2002.

(51) Int. Cl.
G02B 6/26 (2006.01)

(52) U.S. Cl. .......................... 385/27; 385/24; 385/122; 385/123; 359/337

(58) Field of Classification Search .................. 385/24, 385/27, 122, 123; 359/337, 341.1, 341.3; 398/192
See application file for complete search history.

(56) References Cited

U.S. PATENT DOCUMENTS

| | | | |
|---|---|---|---|
| 3,566,128 A | 2/1971 | Arnaud | 250/199 |
| 5,828,478 A | 10/1998 | Thomine et al. | 359/181 |
| 5,911,015 A * | 6/1999 | Bigo | 385/1 |
| 5,933,265 A | 8/1999 | Nagarajan | 359/189 |
| 6,078,416 A | 6/2000 | Yano | 359/158 |
| 6,108,125 A | 8/2000 | Yano | 359/344 |
| 6,141,129 A | 10/2000 | Mamyshev | 359/176 |
| 6,201,621 B1 | 3/2001 | Desurvire et al. | 359/158 |
| 6,335,819 B1 | 1/2002 | Cho et al. | 359/333 |
| 6,437,320 B1 | 8/2002 | Yoshida et al. | 250/227.11 |
| 6,853,774 B2 * | 2/2005 | Watanabe | 385/39 |
| 2001/0013965 A1 | 8/2001 | Watanabe | 359/161 |

OTHER PUBLICATIONS

Jul. 1993, Soliton Transmission Control Time And Frequence Domains, Hirkazu Kubota, Et Al., 2189-2197.
Jul. 1993, A Terahertz Optical Asymmetric Ultiplexer (Toad), J.P. Sokoloff, Et Al., 787-790.
Mar. 1996, Suppression of Signal Fluctuation Induced By Crosstalk Light In A Gain Saturated Laser Diode Amplifier, Kyo Inoue, 458-460.

(Continued)

*Primary Examiner*—Frank G. Font
*Assistant Examiner*—Michael P. Mooney
(74) *Attorney, Agent, or Firm*—Brian S. Steinberger; Phyllis K. Wood; Law Offices of Brian S. Steinberger, P.A.

(57) ABSTRACT

All optical regeneration methods and systems can be realized through an exponential amplifier and a limiting amplifier, which could be two independent devices (one piece of fiber with parametric amplification and a semiconductor optical amplifier operating at saturation state) or one single device (one piece of fiber). The signal quality and the extinction ratio after regeneration are significantly improved compared with the degraded incoming data using a parametric amplifier with the data signal to be regenerated as the pump. The regenerated data has an extinction ratio as high as 14 dB, an extinction ratio enhancement of approximately 5 dB and an approximately 5 dB negative power penalty. This regeneration schemes are format transparent (RZ and NRZ), and provide noise reduction both for bit 1's and bit 0's of the data sequence. The regeneration method and apparatus that just utilizes fibers has the additional capability of ultrafast response speed (several femtoseconds due to the Kerr effect).

48 Claims, 14 Drawing Sheets

OTHER PUBLICATIONS

Nov. 1997, Semiconductor Laser Amplifiers For Ultrafast All-Optical Signal Processing, R.J. Manning, Et Al., 3204-3216.

Mar. 1998, 3.8-THz Wavelength Conversion of Picosecond Pulses Using a Semiconductor Delayed-Interference Signal-Wavelength Converter (DISC), Yoshiyasu Ueno, Et Al., 346-348.

Mar. 1998, 20Gbit/s Optical 3R Regeneration Using Polarisation-Independent Monolithically integrated Michelson Iterferometer, K.S. Jepsen, Et Al., 472-474.

Sep. 1998, All-Optical Data Regeneration Based on Self-Phase Modulation Effect, P.V. Mamyshev, 475-476.

Aug. 1999, 80Gbit/S All-Optical Regenerative Wavelength Conversion Using Semiconductor Optical Amplifier Based Interferometer, A.E. Kelly, 1477-1478.

Dec. 1999, All-Optical 2R Regeneration and Wavelength Conversion as 20 Gb/s Using an Electroabsorption, Pac S. Cho, 1662-1664.

Jan. 2000, All-Optical Noise Suppression Using Two-Stage Highly-Nonlinear Fibre Loop Interferometers, S. Watanabe, Et Al., 52-53.

Jan. 2000, Experimental Demonstration of New Regeneration Scheme for 40Gbit/s Dispersion-Managed Long-Haul Transmissions, P. Brindel, Et Al., 61-62.

Feb. 2000, Dense WDM (0.27bits/s/Hz) 4×40 Gbit/s Dispersion-Managed Transmission Over 1000km With In-Line Optical Regeneration by Channel Pairs, O. Leclerc, Et Al., 337-338.

Feb. 2000, Efficient regenertive Wavelength Conversion at 10Gbit/s Over C- and L-band (80 nm span) using a Mach-Zehnder Interferometer With Monolithically Intergrated Semiconductor Optical Amplifiers, M. Dulk, Et Al, 241-243.

Mar. 2000, 40-Gb/s all-Optical Wavelength Conversion, Regeneration, and Demultiplexing in an SOA-Based All-Active Mach-Zehnder Interferometer, D. Wolfson, Et Al., 332-334.

Jun. 2000, 100 Gbit/s All Optical Wavelength Conversion With Integrated SOA Delayed-Interference Configuration, J. Leuthold, Et al., 1129-1130.

Aug. 2000, Simultaneously Regenerated 4×40 Gbit/s dense WDM Transmission over 10,000km Using Single 40GHz InP Mach-Zehnder Modulator, O. Declerc, Et Al., 1574-1575.

2000, Simultaneous 3R Regeneration and Wavelength Using a Fiber-Parametric Limiting Amplifier, Yikai Su, Et Al., 1-3.

2000, Novel Modulation Techniques, Nick J. Doran, 91-92.

2000, 10 Gbits/s All-Optical 3R Regeneration and Forma Conversion Using a Gain-Switched DFB Laser, M. Owen, Et Al., 472-473.

Oct. 2001, 168-Gb/s All Optical Wavelength Conversion With a Symmetric-Mach-Zehnder-Type Switch, Shigeru Nakamura, Et Al, 1091-1093.

2002, 40 Gbit/s Pseudo-Linear Transmission Over One Million Kilimeters, G. Raybon, Et Al., 1-3.

All-Optical 3R Regeneration and Format Conversion in an Integrated SOA/DFB Laser, M. Owen, Et Al., 1-3.

40 Gbit/s Signal Transmission using Optical 3R Regenerator based on Electroabsorption Modulators, T. Otani, Et Al, 1-3.

20 Gbit/s all-optical Regeneration and Wavelength Conversion Using SOA Based Interferometers, G. Raybon, Et Al., 27-29.

Hirkazu Kubota, Masataka Nakazawa, "Soliton Transmission Control in Time and Frequency Domains," IEEE Journal of Quantum Electronics, vol. 29, No. 7, Jul. 1993 pp. 2189-2197.

J.P. Sokoloff, P.R. Prucnal, I.Glesk, M. Kane, "A Terahertz Optical Asymmetric Demultiplexer (TOAD)," IEEE Photonics Technology Letters, vol. 5, No. 7, Jul. 1993 pp. 787-790.

Kyo Inoue, "Suppression of Signal Fluctuation Induced by Creosstalk Light in a Gain Saturated Laser Diode Amplifier," IEEE Photonics Technology Letters, vol. 8, No. 3, Mar. 1996, pp. 458-460.

R.J. Manning, A.D. Ellic, A.J. Poustie, K.J. Blow, "Semiconductor laser amplifiers for ultrafast all-optical signal processing," J. Opt. Soc. Am. B, vol. 14, No. 11, Nov. 1997, pp. 3204-3216.

Yoshiyasu Ueno, Shigeru Nakamura, Kazuhito Tajima, Shotaro Kitamura, "3.8-THz Wavelength Conversion of Picosecond Pulses Using a Semiconductor Delayed-Interference Signal-Wavelength Converter (DISC)," IEEE Photonics Technology Letter, vol. 10, No. 3, Mar. 1998, pp. 346-348.

K.S. Jepson, A. Buxens, A.T. Clausen, H.N. Poulsen, B. Mikkelson, K.E. Stubkjaer, "20Gbit/s optical 3R regeneration using polarization-independent monolithically integrated Michelson interferometer," Electronics Letters, Mar. 5, 1998, vol. 34, No. 5, pp. 472-476.

P. V. Mamyshev, "All-Optical Data Regeneration Based on Self-Phase Modulation Effect," European Conference on Optical Communication, Sep. 20-24, 1998, Madrid Spain, pp. 475-476.

A.E. Kelly, I.D. Phillips, R.J. Manning, A.D. Ellis, D. Nesset, D. G. Moodie, R. Kashyap, "80 Gbit/s all-optical regenerative wavelength conversion using semiconductor optical amplifier based interferometer," Electronics Letters, Aug. 19, 1999, vol. 35, No. 17, pp. 1477-1478.

Pak S. Cho, Daniel Mahgerefteh, "All-Optical 2R Regeneration and Wavelength Conversion at 20 Gb/s Using an Electroabsorption Modulator," IEEE Photonics Technology Letters, vol. 11, No. 12, Dec. 1999, pp. 1662-1664.

S. Watanabe, S. Takeda, "All-optical noise suppression using two-stage highly0nonlinear fibre loop interferometers," Electronics Letter, vol. 36, No. 1, Jan. 6, 2000, pp. 52-53.

P. Brindel, O. Leclerc, D. Rouvillain, B. Dany, E. Desurvire, P. Nouchi,"Experimental demonstration of new regeneration scheme for 40 Gbit/s dispersion-managed long-haul transmissions," Electronics Letters, vol. 36, No. 1, Jan. 6, 2000, pp. 61-62.

O. Leclerc, P. Brindel, D. Rouvillain, B. Dany, E. Pincemin, E. Desurvire, C. Duchet. A. Shen, F. Blache, F. Devaux, A. Coquelin, M. Goix, S. Bouchoule, P. Nouchi, Dense WDM (0.27 bit/s/Hz) 4×40Gbit/s dispersion-managed transmission over 10000km with in-line optical regeneration by channel pairs, Electronics Letters, vol. 36, No. 4, Feb. 17, 2000, pp. 337-338.

M. Dulk, St. Fischer, E. Gamper, W. Vogt, E. Gini, H. Melchior, W. Hunziker, H.N. Poulsen, A.T. Clausen, A. Buxens, P. Jeppesen, "Efficient regenerative wavelength conversion at 10 Gbit/s over C- and L-band (80 nm span) using a Mach-Zehnder interferometer with monolithically integrated semiconductor optical amplifiers," Electronics Letters, vol. 36, No. 3, Feb. 3, 2000, pp. 241-243.

D. Wolfson, A. Kloch, T. Fjelde, C. Janz, B. Dagens, M. Renaud, "40-Gb/s All-Optical Wavelength Conversion, Regeneration, and Demultiplexing in an SOA-Based All-Active Mach-Zehnder Interferometer," IEEE Photonics Technology Letters, vol. 12, No. 3, Mar. 2000, pp. 332-334.

J. Leuthold, C.H. Joyner, B. Mikkelsen, G. Raybon, J.L. Pleumeekers, B.I. Miller, K. Dreyer, C.A. Burrus, "100 Gbit/s all-optical wavelength conversion with integrated SOA delayed-interference configuration," Electronics Letters, vol. 36, No. 13, Jun. 22, 2000, pp. 1129-1130.

O. Leclerc, B. Dany, D. Rouvillain, P. Brindel, E. Desurvire, C. Duchet, A. Shen, F. Devaux, A. Coquelin, M. Goix, S. Bouchoule, L. Fleury, P. Nouchi, "simultaneously regenerated 4×40 Gbit/s dense WDM transmission over 10,000 km using single 40 GHz InP Mach-Zehnder modulator," Electronics Letters, vol. 36, No. 18, Aug. 31, 2000, pp. 1574-1575.

Yikai Su, Lijun Wang, Anjali Agarwal, Prem Kumar, "Simultaneous 3R regeneration and wavelength conversion using a fiber-parametric limiting amplifier," Optical Society of America, 2000, pp. MG41-MG4-3.

F. Liu, X. Zhang, R.J.S. Pedersen, P. Jeppesen, , "Interferometric crosstalk suppression using polarizationmultiplexing technique and an SOA," IEEE Photonics Technology Letters, CLEO 2000, pp. 91-92.

M. Owen, V. Saxena, R.V. Penty, L.H. White, "10-Gbits/s all-optical 3T regeneration and format conversion using a gain-switched DFB laser," IEEE Photonics Technology Letters, CLEO 2000, pp. 472-473.

Shigeru Nakamura, Yohiyasu Ueno, Kazuhito Tajima, "168-Gb/s All-Optical Wavelength Conversion With a Symmetric-Mach-Zehnder-Type Switch," IEEE Photonics Technology Letters, vol. 13, No. 10, Oct. 2001, pp. 1091-1093.

G. Raybon, Y. Su, J. Leuthold, R-J. Essiambre, T. Her, C. Joergensen, P. Steinvurzel, K. Dreyer K. Feder, "40 Gbit/s Pseudo-linear Transmission Over One Million Kilometers," IEEE Photonics Technology Letters, Optical Fiber Communications Conf., 2002, pp. FD101-FD103.

M. Owen, M.F.C. Stephens, R.V. Penty, I.H. White, "all-Optical 3R Regeneration and Format Conversion in an itegrated SOA/DFB Laser," IEEE Photonics Technology Letters, Optical Fiber Communications Conf., 2000, pp. 76-78.

Tomohiro Otani, Tetsuya Miyzaki, Shu Yamamoto, "40 Gbit/s Signal Transmission using Optical 3R Regenerator based on Electroabsorption Modulators," IEEE Photonics Technology Letters, Optical Fiber Communications Conf., 2000, pp. 226-228.

G. Raybon, B. Mikkelsen U. Koren, B.I. Miller, K. Dreyer, L. Boivin, S. Chandrasekhar, C.A. Burrus, "20 Gbit/s all-optical regeneration and wavelength conversion SOA based interferometers," IEEE Photonics Technology Letters, Optical Fiber Communications Conf., 1999, pp. 27-29.

* cited by examiner

ALL OPTICAL REGENERATION

This invention claims the benefit of priority to U.S. Provisional patent application Ser. No. 60/410,110 filed Sep. 12, 2002.

FIELD OF THE INVENTION

This invention relates to optical communication systems, and more particularly to all optical systems and methods of data regeneration after signal degradation occurs due to long distance transmission.

BACKGROUND AND PRIOR ART

To meet the growing capacity demand of fiber optic communication system, more channels and higher line-rates have to be considered in dense wavelength-division multiplexing (DWDM) systems. These systems suffer from many propagation impairments, such as amplified spontaneous-emission (ASE), four-wave mixing (FWM), cross phase modulation (XPM), and stimulated Raman scattering (SRS).

All these effects limit the transmission distance and optical regeneration is necessary to restore optical data signals. In an all-optical network, the need is even more acute as the optical signal may not only travel over variable distance but also go through unpredictable numbers of switching nodes.

In conventional opto-electronic repeater/regenerators, two complete WDM (wave-division multiplexing) terminal equipments in a back-to-back configuration are used. They are expensive since both O-E and E-O conversion are required, and will be finally bandwidth-limited. In the future high speed long-haul transmission systems or large-scale optical networks, all-optical regeneration, including 2R (re-shaping and reamplification) and 3R (2R plus retiming) are key technologies to overcome the electronic bottleneck.

Many approaches have been proposed for optical 3R regeneration. The majority of them can be classified into the following categories: 1) cross-gain modulation (XGM) regenerators using semiconductor optical amplifiers (SOA) and/or distributed feedback (DFB) lasers; 2) interferometric regenerators using cross phase modulation (XPM) in SOAs or optical fiber; 3) cross-absorption modulation in electro-absorption modulators (EAM); 4) soliton-based regenerators using synchronous modulation; 5) noise suppression on bit 1's using gain saturation in SOAs or fiber parametric amplifiers; and 6) regenerators based on spectral broadening due to self-phase modulation (SPM); 7) high-order parametric processes.

Regeneration schemes based on gain dynamics of SOAs are limited in speed by the carrier recovery time and in ER by weak gain saturation. As a result, it is unlikely XGM or gain saturation in SOAs will function at 40 Gb/s and above. Other schemes and their potential problems with these approaches are hereafter discussed to place the invention of this application in the proper context. The review is focused on nonlinear optical gating.

Interferometric Regenerators

Interferometric regenerators based on XPM in SOAs can be of the Mach-Zehnder (MZ), Michelson or delay interferometer types exploiting similar phase dynamics as used in the terahertz optical asymmetric demuliplexer (TOAD). A MZ regenerator uses two symmetric SOAs. The input data to be regenerated is split into two equal parts, one is delayed with respect to the other. The retimed clock pulses are also fed equally into the two MZ arms. Because of the relatively delay, the phase difference experienced by the clock pulses in the two arms is roughly a series of rectangular pulse of width $\tau$ and height $\pi$. The transfer function of the interferometer is $\sin[(\Phi_1-\Phi_2)/2]$. The speed of operation of this regenerator is limited only by the rise time, not by the carrier recovery time. As a result, regenerators based on XPM in SOAs have been demonstrated to operate as high as 80 Gb/s (and XPM based wavelength conversion up to 160 Gb/s). The other advantage is that the sensitivity of such regenerators is among the highest of all the optical regenerators due to strong nonlinearities in SOAs. The disadvantages of this type of regenerator are as follows. Because data to be regenerated in general will have long-term average power fluctuations and short-term pattern-dependent effects, the data need to be pre-processed so that the peak power of each bit is the same. Pre-processing in general only optimize operation of bit 1's of the original data to be regenerated. Therefore only the noise of bit 1's (non-inverting regenerator) or bit 0's (inverting regenerator) will be reduced by the regenerator depending on the initial phase delay of the interferometer.

Interferometric regenerators based on XPM in fibers are in general realized in the form of a nonlinear optical loop mirror (NOLM). It exploits the phase difference between the co-propagating and counter-propagating path. The NOLM has ultra high speed potential. It is not very practical because of the interferometric stability with long (~km) length of the fiber loop, and as in the case of SOA based XPM regenerators, it requires preprocessing.

Cross-Absorption Regenerators

All-optical regenerator based on cross-absorption modulation in EAMs exploits saturation effects in EAMs. This regenerator consists of an EAM with two inputs: the data to be regenerated and a probe laser. At bit 1's, the input data saturates the absorption of the EAM, leaving it transparent to the probe laser. At bit 0's the EAM is still absorptive to the probe laser. In order to obtain (thresholding effects) improved ER, the EAM should be biased at a very lossy state and strong injection power is required. The average power required for the data signal is on the order of +17 to +19 dBm. The speed is limited by the carrier recombination speed, which is in general faster than the carrier recovery speed of lasers. Speeds up to 40 Gb/s have been demonstrated. The disadvantages of cross-absorption regenerators are: 1) it has a very low sensitivity (high input power) and 2) the speed is limited to about 40 Gb/s.

Soliton-Based Regenerators

Soliton-based regenerator exploits the robustness of soliton pulses under synchronous modulation. Synchronous modulation has been used to transmit solitons over unlimited distance. Soliton-based regenerator first converts the regular dispersion-managed RZ pulses to soliton pulses, which is optically filtered and then synchronously modulated by a recovered clock signal (synchronous modulation). The soliton pulses (bit 1's) that emerge from synchronous modulation is robust while noise pulses (bit 0's) will disperse. In addition, synchronous modulation reduces jitter in soliton pulses as the centers of the pulses attract towards transmission peaks at exactly the clock rate. This process can be repeated, each time resulting in a better ER and smaller jitter until reaching an ER and a jitter floor. Although synchronous modulation of multiple channels can be envisioned, RZ-to-soliton and soliton-to-RZ conversions have to be performed in separate channels since the conversion conditions for each channel are different. In addition synchronous modulation requires that each channel have the same clock rate. This is not generally satisfied because different WDM channels often come from different sources with independent clocks. Despite the attention this scheme has received, this approach is not cost effective with OEO regeneration when the cost of preprocessing (RZ to soliton) and post processing (soliton to RZ), which needs to be performed on a per channel basis, is factored in.

Regeneration Using Gain Saturation in Fiber Parametric Amplifiers

This involves regeneration using gain saturation in fiber parametric amplifier (FPA). The pump for the parametric amplifier is a CW laser (for 2R) or retimed clock pulse train (for 3R) and the data to be regenerated is used as the probe. Before input into the FPA, the probe is amplified so that bit 1's will saturate the pump. As a result only bit 1's can be reshaped. It should be noted that this gain saturation is due to pump depletion when the pump power is transferred to the probe. Compared to SOA's with saturated gain, this scheme can operate at high speeds. Inherently, this scheme is not very competitive because reshaping of the bit 1's comes at the expenses of reduced ER. As a result, negative power penalty cannot be achieved. Practically, when a signal needs to be regenerated, its ER is already low and the reshaped signal with a further reduction in ER would not be able to transmit any further in fiber.

Regeneration Using Self-Phase Modulation

In regeneration using self-phase modulation, the input pulses to be regenerated have a spectral width on the order of $\Delta\omega_0 \sim 1/\tau$, where $\tau$ is the pulse width. Due to the effect of SPM, the spectral bandwidth of the pulses broadens to $\Delta\omega_{SPM} = \Delta\omega_0(2\pi/\lambda)n_2 I_p L$, where $I_p$ is the pulse intensity (which can fluctuate), $n_2$ is the nonlinear refractive, $\lambda$ is the wavelength and L is the length of the nonlinear fiber. After SPM, the pulses pass through an optical filter whose center frequency, $\omega_f$, is shifted with respect to the input signal carrier frequency, $\omega_0$ as $\omega_f = \omega_0 + \Delta\omega_{shift}$. If the spectral broadening of the pulse is small enough so that $\omega_{SPM}/2 < \Delta\omega_{shift}$, the pulse is rejected by the filter. If the pulse intensity is high enough so that $\omega_{SPM}/2 \geq \Delta\omega_{shift}$, a part of the SPM-broadened spectrum passes through the filter. This regeneration scheme on surface is quite attractive. It uses only passive component, can lead to ER improvement. However, there is a major problem in terms of retiming with this scheme. First, it does not allow a retiming mechanism. Second, the intensity fluctuations (noise and pattern effects) in the input data can lead to significant jitter up to ±10% $\tau$. To solve the retiming issue, this scheme has been combined with synchronous modulation.

High-Order Parametric Processes

Recently optical regeneration using high-order parametric processes has been proposed. It relies on multiple nonlinear optical interactions that involve multiple pumps and multiple idlers. As such, it is complicated, requires complicated filtering, and has limited dynamic range.

Thus, the need exists for solutions to the above problems of the prior art.

SUMMARY OF THE INVENTION

A primary objective of the present invention is to provide a method and apparatus for all-optical 2R (reamplification and reshaping) regeneration.

A secondary objective of the present invention is to provide a method and apparatus for all-optical 3R (2R plus retiming) regeneration.

A preferred embodiment of the invention is the 2R regeneration apparatus that comprises: a high power Erbium-doped fiber amplifier (EDFA) which boosts the input data signal as the pump of the exponential amplifier; a continuous wave(CW) probe; an exponential amplifier which could be a piece of fiber with parametric amplification; and a limiting amplifier, which could be a SOA.

Another preferred embodiment of the invention is the 2R regeneration apparatus that comprises: a high power Erbium-doped fiber amplifier (EDFA) which boosts the input data signal as the pump of the exponential amplifier; a continuous wave(CW) probe; a fiber parametric amplifier in which the exponential gain at low pump levels is followed by flattened gain at high power levels due to self-phase modulation induced spectral broadening.

The preferred embodiments of the invention for 3R regeneration are different from the aforementioned 2R regeneration apparatuses in that the CW probe of the former is replaced by pulsed light source with its timing provided by clock recovery.

The applications of the present invention include all-optical regeneration in long-haul fiber communication systems or optical networks, especially when the signal travels an unpredicted distance and become distortion. It also could be used as a front-end of the optical receiver to improve the signal extinction ratio to minimize the error rate.

Further objects and advantages of this invention will be apparent from the following detailed description of a presently preferred embodiment which is illustrated schematically in the accompanying drawings.

DESCRIPTION OF THE PREFERRED EMBODIMENTS

Figure 1:
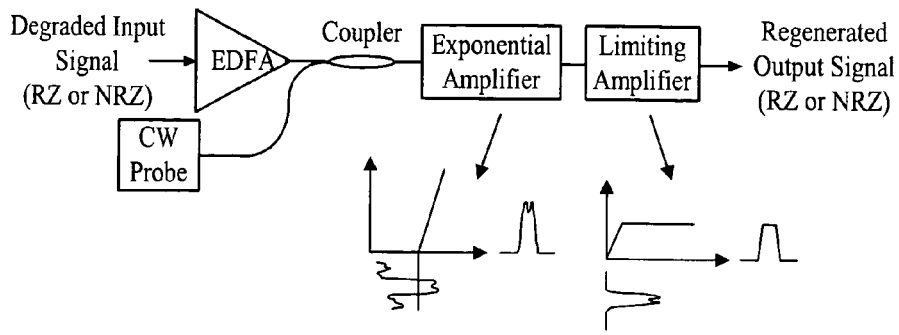
FIG. 1 is a first preferred embodiment layout for a format insensitive 2R regeneration.

Before explaining the disclosed embodiments of the present invention in detail it is to be understood that the invention is not limited in its application to the details of the particular arrangements shown since the invention is capable of other embodiments. In addition, the terminology used herein is for the purpose of description and not of limitation.

With respect to the terminology, a short review is presented hereafter for a better understanding of the preferred embodiments. When used in the context of 3R, the reshaping comprises two sub-functions: enhancement of the extinction ratio and noise reduction for bit 0's as well as bit 1's, which are realized by exponential amplification followed by limiting amplification. This invention lists 3 different combinations for the exponential amplification and the limiting amplification as follows: (a) a piece of fiber (dispersion shifted fiber or photonic crystal fiber) with parametric amplification as an exponential amplifier, where the bit 0's of the input signal are located in the exponential amplification region; a semiconductor optical amplifier (SOA) operating in gain saturation state as a Limiting amplifier. (b) One piece of fiber as an exponential amplifier and another piece of fiber with different parameters as a limiting amplifier, where the bit 0's are located in the exponential amplification region of the first fiber segment and the bit 1's are located in the gain saturation region of the second fiber segment. (c) One piece of fiber as both an exponential amplifier and a limiting amplifier, where the bit 0's and bit 1's of the input signal are located in the exponential amplification region and gain saturation region respectively.

The 2R regeneration scheme includes a high power EDFA, which boosts the input data signal as the pump of the exponential amplifier, a continuous wave (CW) probe, an exponential amplifier, which is a piece of fiber with parametric amplification in present invention, and a limiting amplifier, which could be a semiconductor optical amplifier (SOA) or a piece of fiber with parametric amplification operating in the saturation state, and the like. An advantage of using fiber with parametric amplification over SOA is its speed is significantly improved, but the parameters of the fiber should be carefully designed.

The only difference in the 3R regeneration scheme is the CW probe is replaced with a clock recovery module, the input of which could be incoming signal or regenerated signal. The latter choice will be more favorable since the clock component will be stronger and clock recovery module will work better.

The applications of the present invention include all-optical regeneration in the long-haul fiber communication system or optical network, especially when the signal travels an unpredicted distance and become distortion. It also could be used as a front-end of the optical receiver to improve the signal extinction ratio to minimize the error rate.

The origin of fiber parametric processes lies in the nonlinear polarization induced by the applied optical field through nonlinear susceptibilities. When an intense pump wave is input to a fiber together with a signal wave, the signal is amplified, and at the same time a new signal called idler wave is generated, provided the phase matching condition is satisfied. Under the small signal condition (pump is not depleted), the parametric conversion efficiency (the idler power divided by input signal power) increases exponentially with the pump power as indicated by equation (1).

$$G_C \cong \frac{1}{4}\exp(2\gamma P_0 L) \quad (1)$$

where $\gamma$ is the nonlinear coefficient, $P_0$ is the pump power, and L is the length of the nonlinear fiber. For standard dispersion shifted fiber, a nonlinear coefficient of $\gamma=2.7/$km/W and an effective area of $A_{eff}=57$ $\mu m^2$.

The principle of the two-stage 2R regeneration scheme is shown in FIG. 1, where a first-stage exponential amplifier (such as an optical fiber parametric amplifier) precedes a second-stage limiting amplifier (such as an SOA.). The input signal to be regenerated is used as the pump of the exponential amplifier, whose gain increases exponentially with the pump power such as the case of optical fiber parametric amplifier. Therefore, bit 1's will provide more gain to the CW probe than bit 0's, thus increasing the extinction ratio of the output signal from the parametric amplifier. However, because of the exponential gain characteristics of the amplifier, the noise on bit 1's in the pump (i.e., the data to be regenerated) will be transferred to the output. The second-stage amplifier such as an SOA provides gain-saturation to provide noise reduction on bit 1's. In conclusion, the exponential amplifier provides extinction ratio enhancement while the saturation amplifier provide noise reduction on bit 1's.

Figure 2:
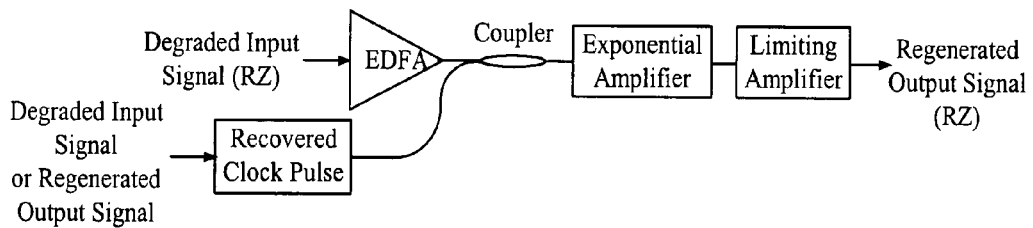
FIG. 2 is a first preferred embodiment layout for a format insensitive 3R regeneration.
Figure 3:
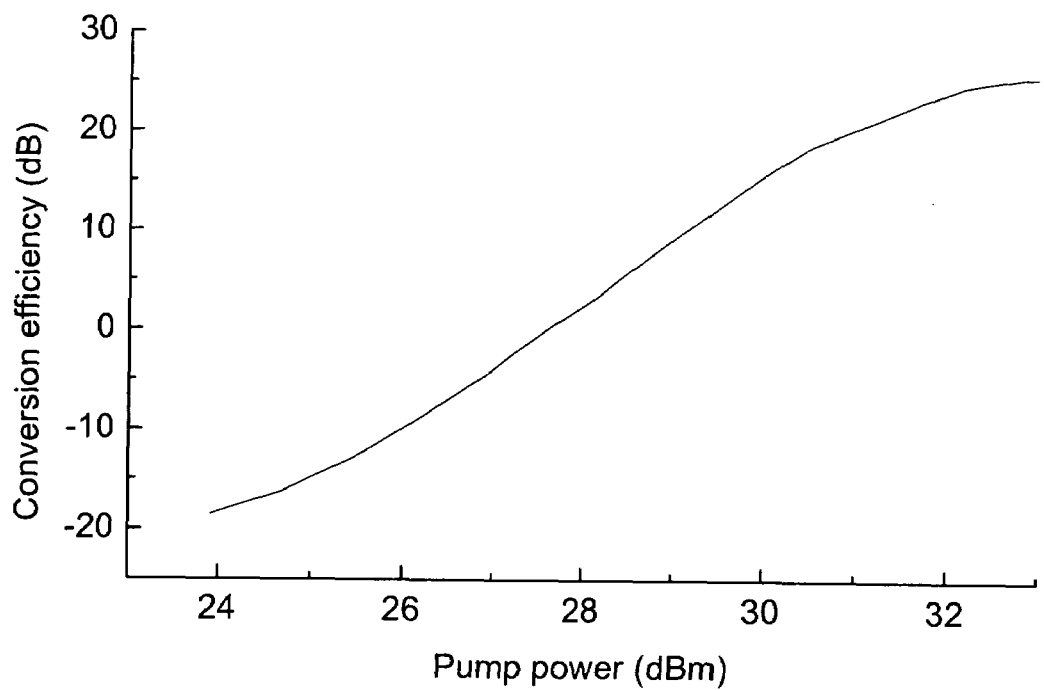
FIG. 3 shows the parametric conversion efficiency as a function of the peak pump power shows the exponential relationship with moderate pump condition.

The principle of the two-stage 3R regeneration scheme shown in FIG. 2 is similar to FIG. 1 except the CW probe is replaced by a retimed pulsed probed, The experimentally measured parametric conversion efficiency vs. peak pump power is shown in FIG. 3, where the gain media is an approximately 2 km long dispersion shifted fiber with zero-dispersion wavelength of approximately 1555 nm. The pump wavelength and the probe wavelength are approximately 1556 nm and approximately 1564 nm respectively. For example, if the pump signal has an extinction ratio of approximately 4 dB (approximately 26 dBm for low level and approximately 30 dBm for high level), the idle signal would have an extinction ratio of approximately 25 dB. On the other hand, this exponentially increasing conversion efficiency can also amplify the amplitude fluctuation at bit 1. It is therefore necessary to deploy a limiting amplifier to suppress these amplitude fluctuations. A semiconductor optical amplifier (SOA) can act as a limiting amplifier if the input power is high enough to saturate its gain.

Figure 4:
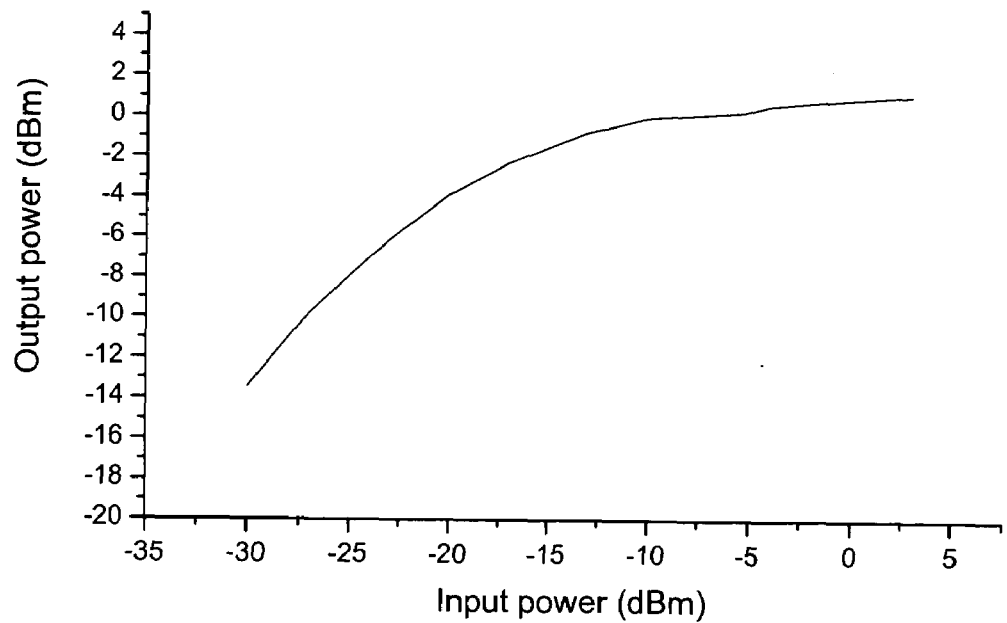
FIG. 4 shows the output vs. input power relationship of SOA at saturation state.

FIG. 4 shows the output power as a function of the input power, where the injection current of SOA is approximately 145 mA. It clearly indicates that the SOA falls into deep saturation at high input powers. When the input power is > approximately −4 dBm, the output power fluctuation is less than approximately 0.5 dB even if the input power fluctuates in a range of approximately 7 dB. The amplitude fluctuation at bit 1 is therefore suppressed.

Figure 5A:
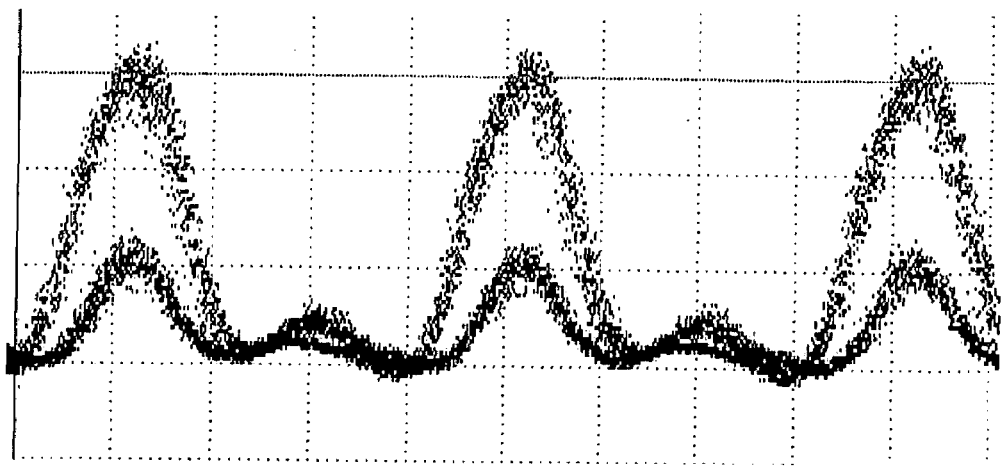
FIG. 5a shows eye diagrams at approximately 5 Gb/s for a extinction ratio seriously degraded signal. The horizontal scale is approximately 50 ps/div and the vertical scale is 200 mV/div. The extinction ratios are approximately 4.5 dB, approximately 18 dB, and approximately 15.4 dB respectively.
Figure 5:
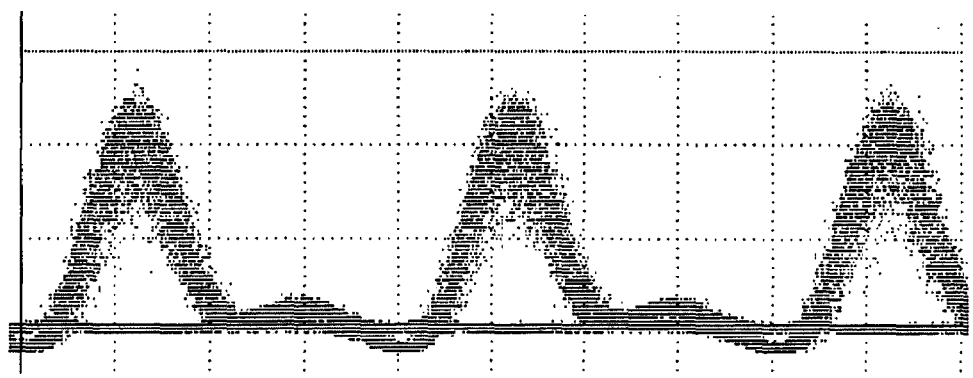
FIG. 5b shows an eye diagram at approximately 5 Gb/s for a idler signal after parametric amplification by a DSF.
FIG. 5c shows an eye diagram at approximately 5 Gb/s for final regenerated signal.
Figure 5C:
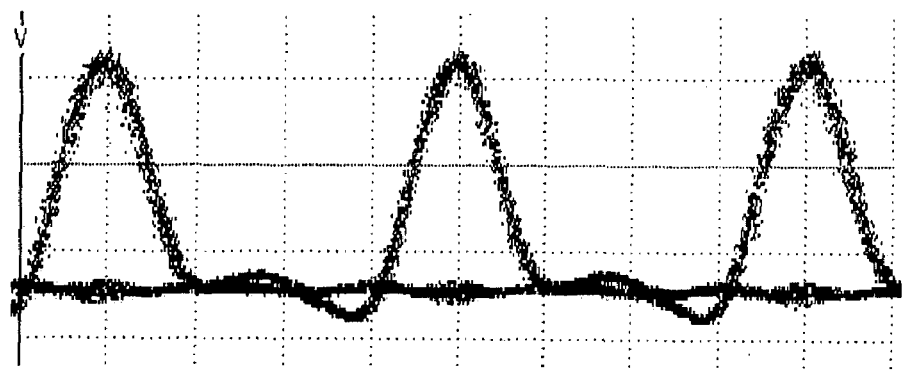

FIGS. 5a and 5b show the approximately 5 Gb/s eye-diagrams before and after parametric amplification, where the signal wavelength was approximately 1564 nm and the pump peak power was approximately 1.4 W, respectively. The amplitude noise at bit 0's was suppressed due to the threshold characteristics of parametric amplification. The extinction ratio improved significantly from approximately 4.5 dB to approximately 18 dB. However, parametric amplification could not suppress the amplitude noise at bit 1's. In fact it amplified the amplitude noise at bit 1's due to its exponential gain response to the pump power.

By employing an SOA operating in saturation state, the amplitude noise at bit 1's could be reduced. The eye diagram of the regenerated data shown in FIG. 3c indicates that an extinction ratio of approximately 15.4 dB was achieved when the average input power was approximately −15 dBm. The extinction ratio degraded by approximately 2.6 dB relative to the signal directly after parametric amplification since $SOA_2$ "exaggerated" the noise level of bit 0's. The overall improvement of extinction ratio of the regenerated data was approximately 11 dB (over the degraded incoming data).

Figure 6:
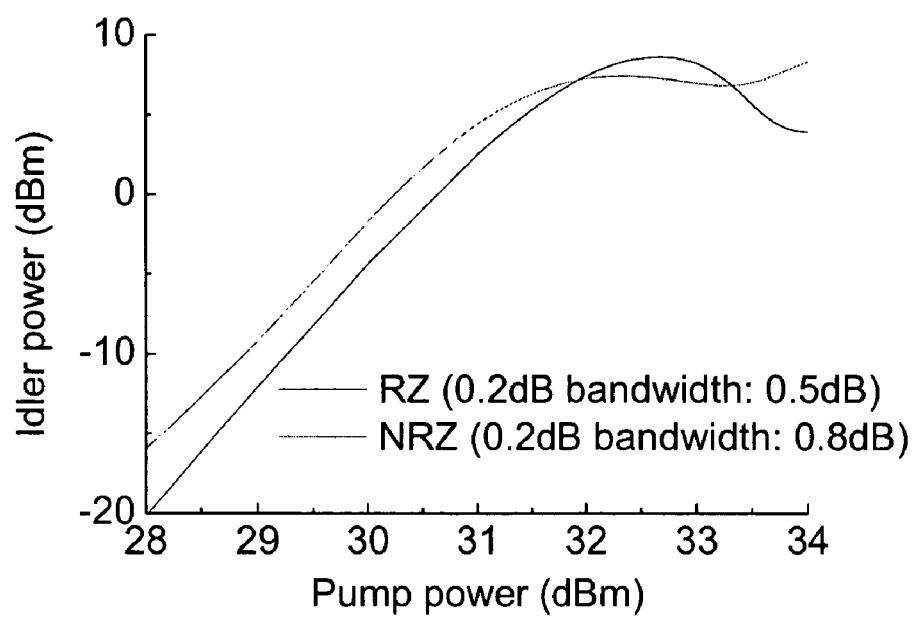
FIG. 6 shows simultaneous exponential amplification and limiting amplification with a single piece of fiber as a parametric amplifier.
Figure 7:
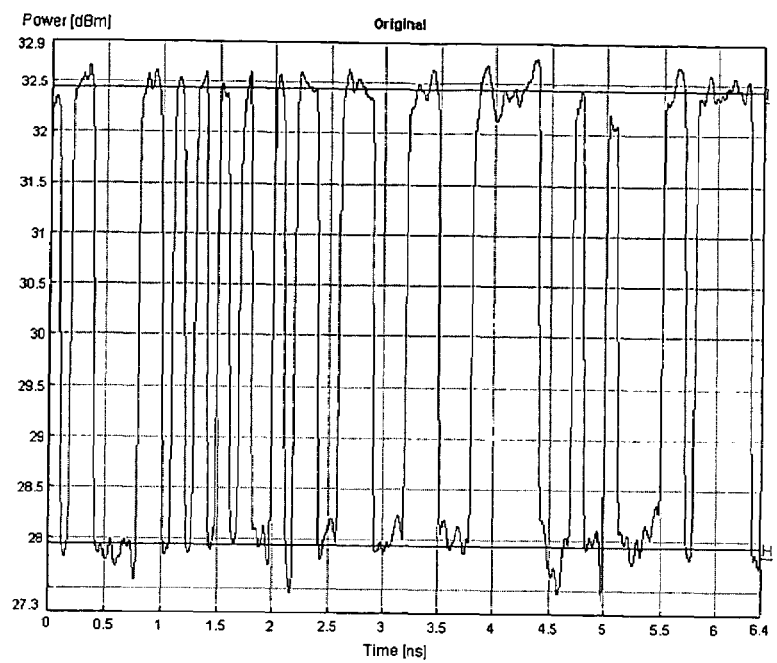
FIGS. 7a, 7b, 7c, and 7d shows 2R regeneration for approximately 10 Gb/s NRZ data.
Figure 7B:
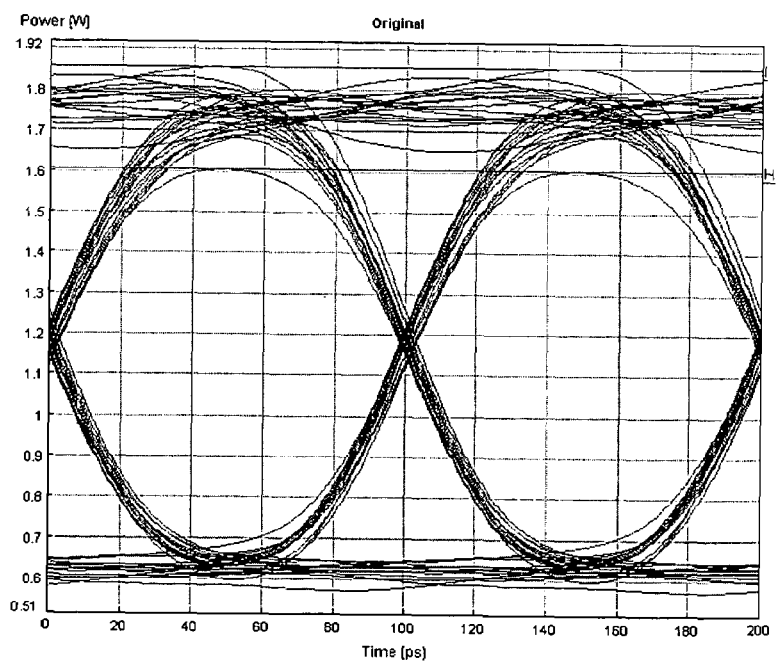
Figure 7:
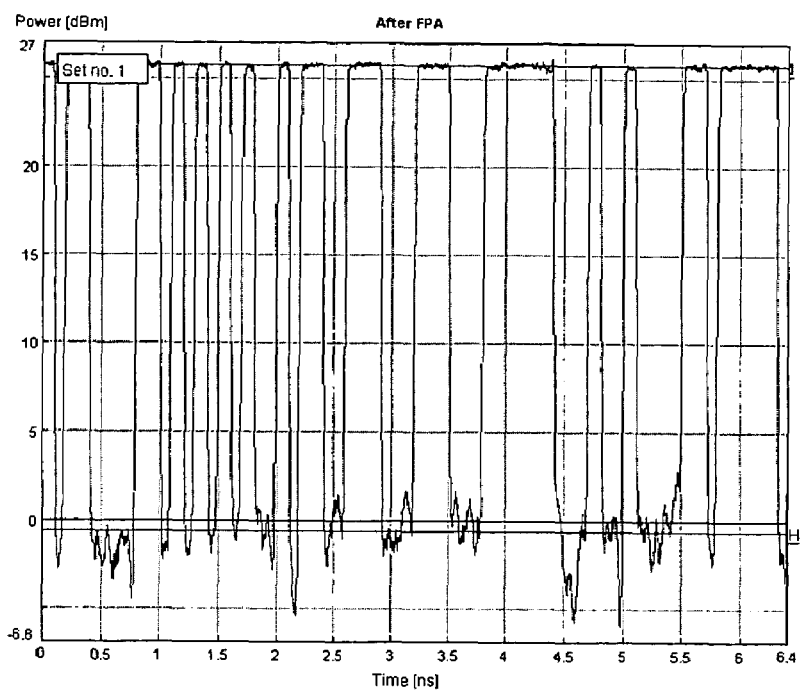
Figure 7:
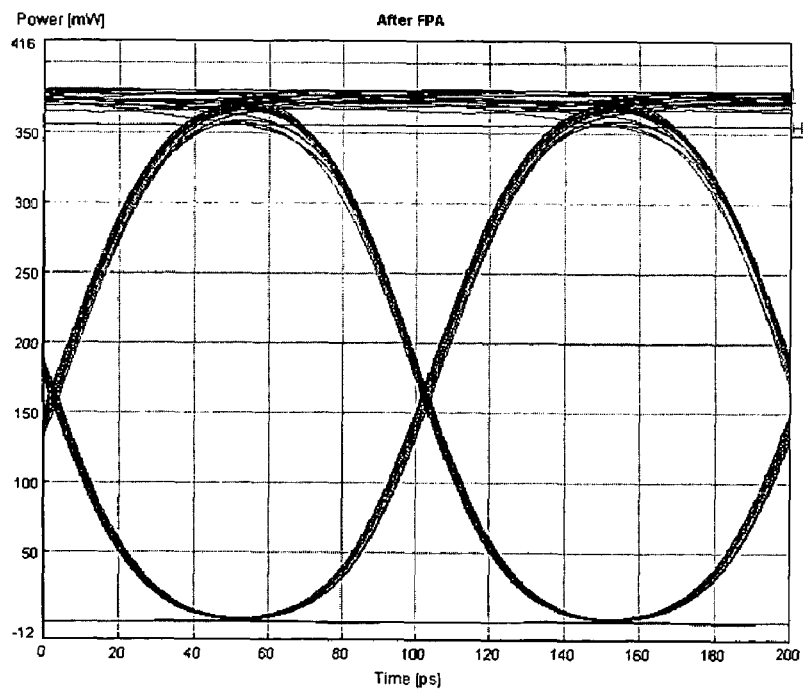
Figure 8:
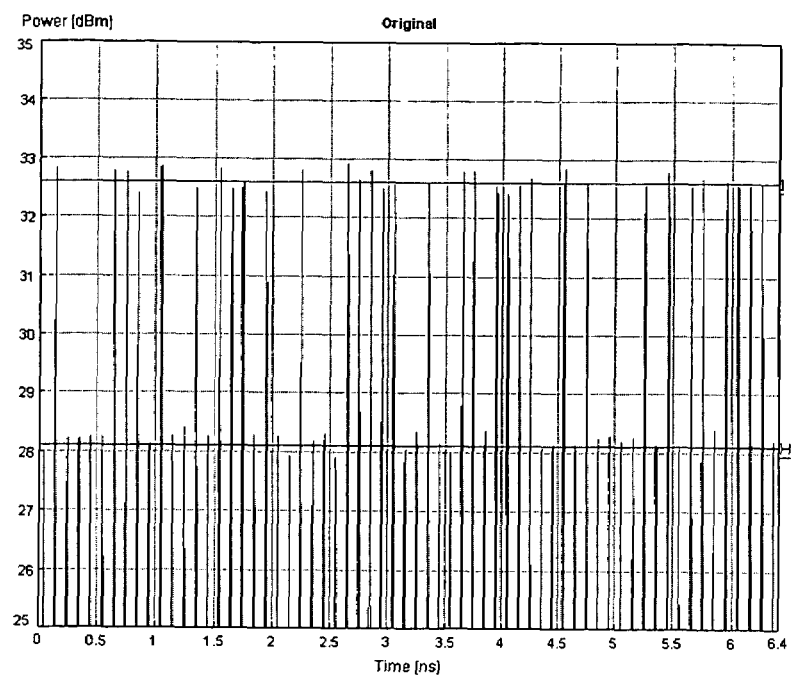
FIGS. 8a, 8b, 8c and 8d shows 2R regeneration for approximately 10 Gb/s RZ data.
Figure 8:
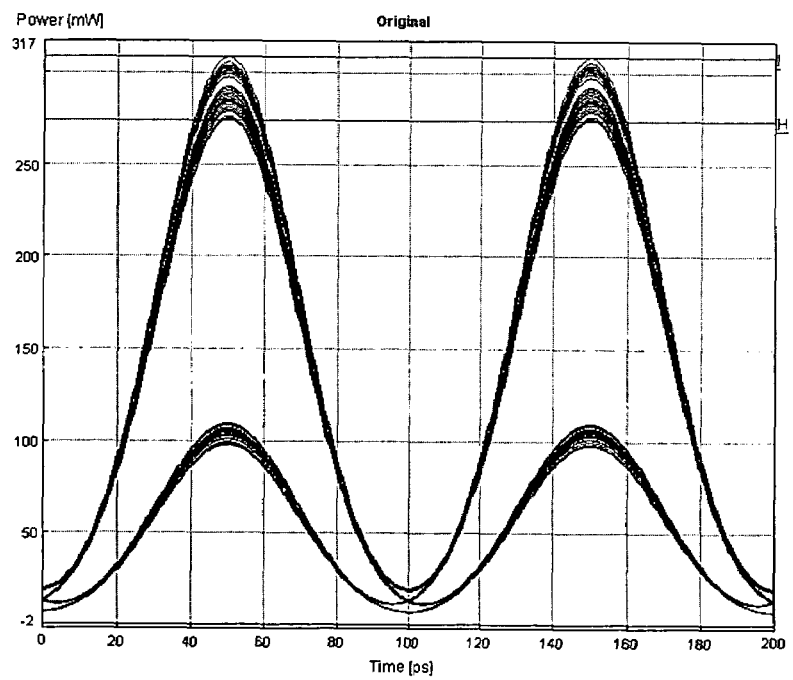
Figure 8:
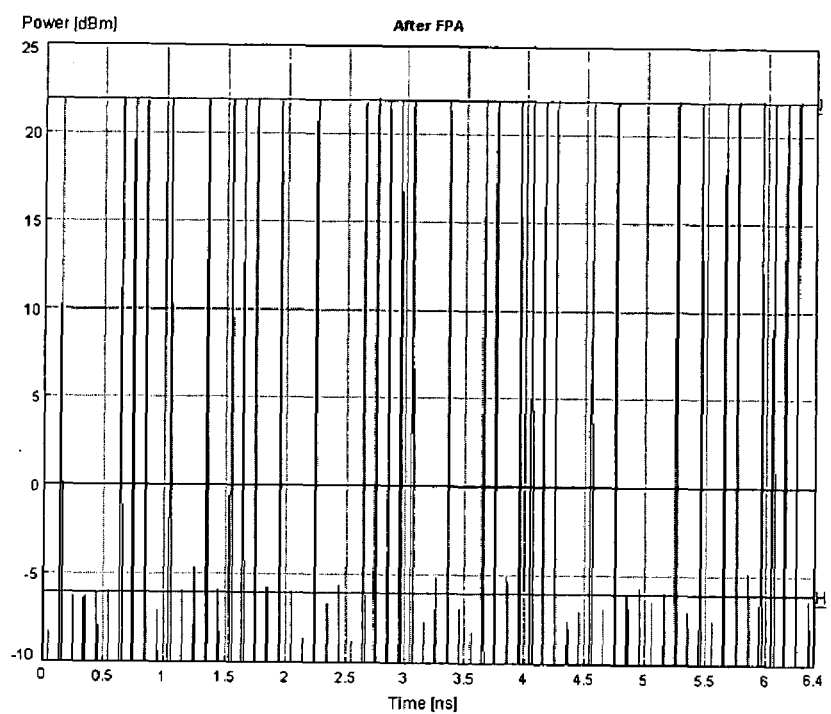
Figure 8:
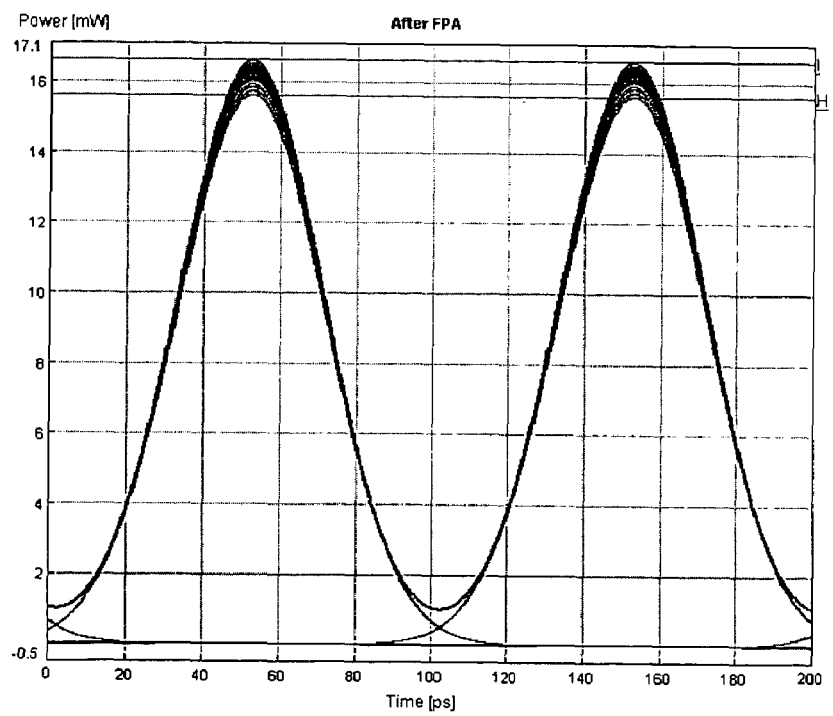

The exponential amplification and limiting amplification are also possibly realized by just one piece of fiber. The idler power vs. pump peak power relationship is shown in FIG. 6. To demonstrate the format transparency, RZ and NRZ data signals are used as the pump respectively. The emergence of gain flattened (limiting gain) region is due to self-phase modulation induced spectral broadening which cause the pump power to be transferred to its neighboring frequencies rather than to the idler. If the bit 0's of the pump signal are located in the exponential region while the bit 1's are located at the saturation region, the noises of both bit 1's and bit 0's will be reduced and the extinction ratio will be improved at the same time. FIGS. 7a, 7b, 7c and 7d and FIGS. 8a, 8b, 8c and 8d simulates the signal regeneration for NRZ and RZ format respectively.

The main drawback of using dispersion shifted fiber as the parametric media is very high operating power requirement. However, this could be overcome by using highly nonlinear fiber by, for example, increasing Ge concentration in fiber core or creating photonic crystal fibers, both of which are currently intensively studied.

Figure 9:
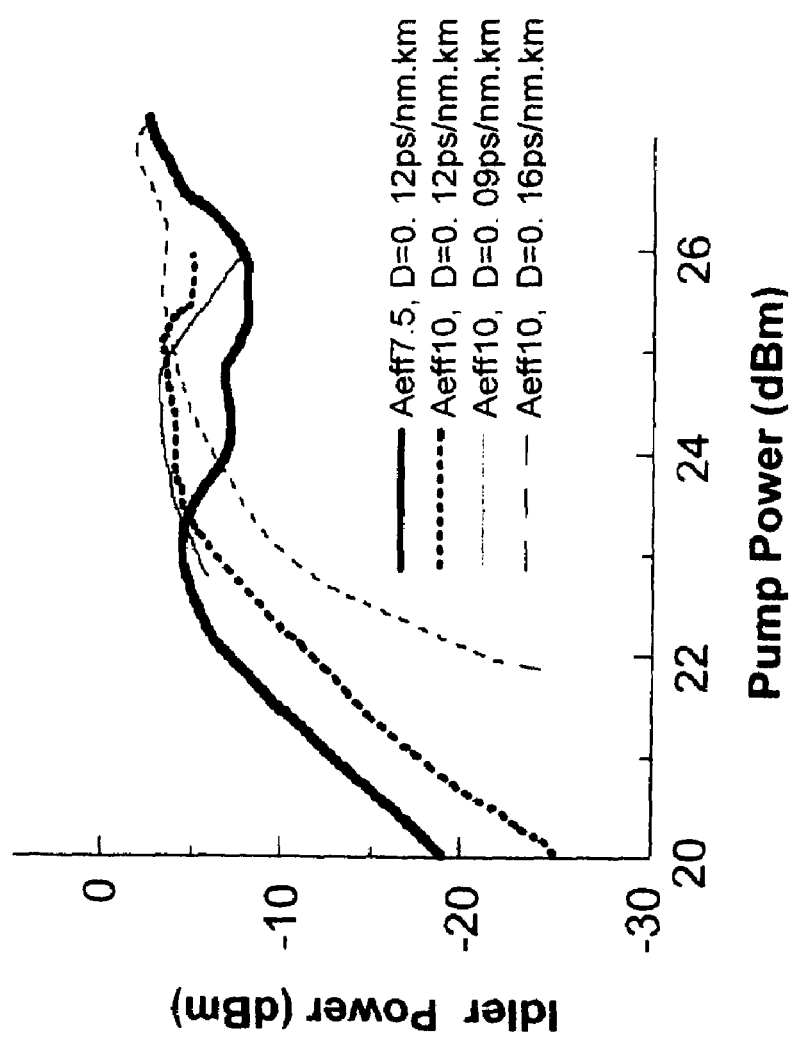
FIG. 9 shows a graph of sensitivity improved by using highly nonlinear crystal fiber.

FIG. 9 shows the output idler power vs. pump peak power relationship by decreasing the effective core area from 55 $\mu m^2$ of the regular dispersion shifted fiber to approximately 10 $\mu m^2$. It could be noted that the pump threshold is decreased about approximately 10 dB if compared to FIG. 6.

Figure 10:
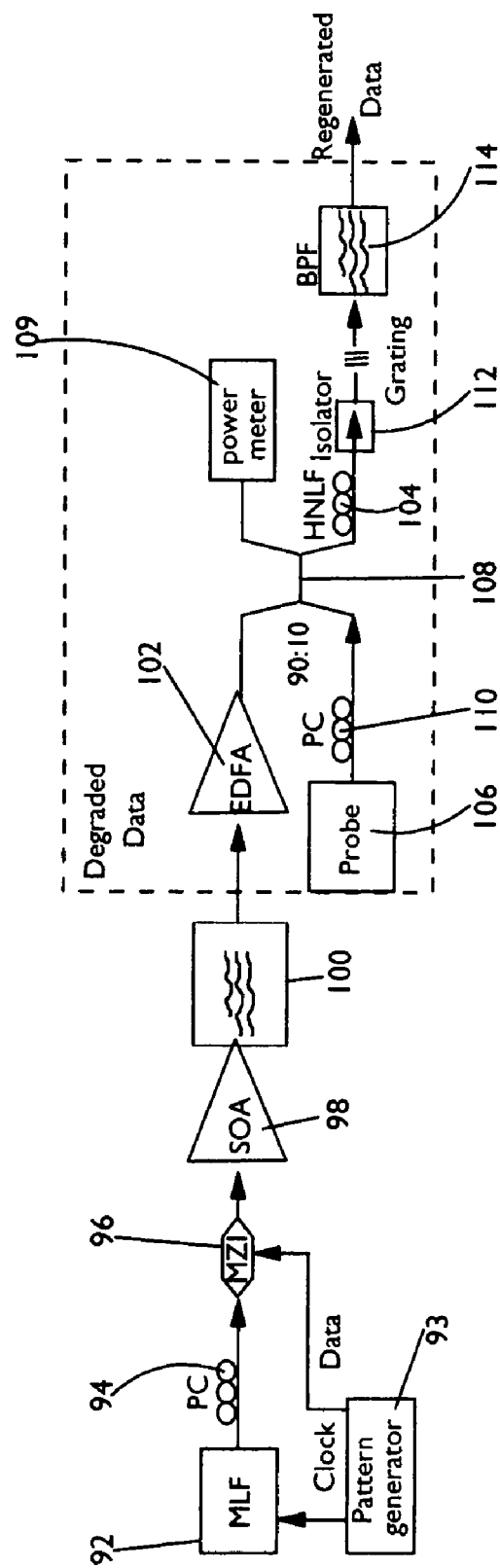
FIG. 10 shows the experimental setup for 2R regeneration.

To more fully understand the 2R embodiment of the invention, reference should be made to FIG. 10 which illustrates the various components of the experimental setup for 2R regeneration including: the mode-locked fiber laser (MFL) 92; polarization controller (PC) 94: MZI: Mach-Zender $LiNbO_3$ modulator (MZI) 96:, semiconductor optical amplifier (SOA) 98; BPF: bandpass filter (BPF) 100; $Er^{3+}$ doped fiber amplifier (EDFA) 102; and, the highly nonlinear fiber (HNLF) 104.

In this experimental set up an approximately 9.953 GHz pulse train with an approximately 6 ps pulsewidth was generated from the mode-locked fiber laser (MFL) 92. It was then encoded with an approximately 9.953 Gb/s pseudo-random bit-stream (PRBS) 93 of pattern length up to approximately $2^{31}-1$ through an external modulator. The semiconductor optical amplifier (SOA) 98 with a bias current of approximately 145 mA operating in saturation was used to introduce noises on bit 0's and 1's as well as pattern effect to the data signal to be regenerated. The optical bandpass filter 100 right after the SOA 98 was used to block the strong broadband ASE noise. The center wavelength of the data signal before and after the SOA 98 were approximately 1556 nm and approximately 1556.5 nm (due to the red shift of the saturated amplification). The data pulse train was amplified by an EDFA 102 and then launched into a 6 km long highly nonlinear fiber (HNLF) 104 as the pump of the fiber parametric amplification. The HNLF has a very small dispersion slope (approximately 0.017 $ps/nm^2/km$) around its zero-dispersion-wavelength approximately 1552 nm. A CW laser 106 at approximately 1561.5 nm with the power level of approximately 8 dBm, which acts as the probe signal was coupled into the HNLF 104 through the 10% input port of a 90:10 coupler 108 with a power meter 109 attached thereto. The polarization state of the CW signal was adjusted by a polarization controller 110 to obtain the highest parametric gain. To prevent the strong pump signal from damaging the connectors and detectors, an optical isolator 112 and a fiber Bragg grating 114, which was tuned to reflect the pump wavelength, were inserted right after the HNLF 104 to block the pump signal. An optical bandpass filter 114 with a 3-dB bandwidth of approximately 1 nm was used to select the idler component at approximately 1551.5 nm. The regenerated data 116 was analyzed by a digital sampling oscilloscope and an error detector(not shown).

Experimental Results

Figure 11:
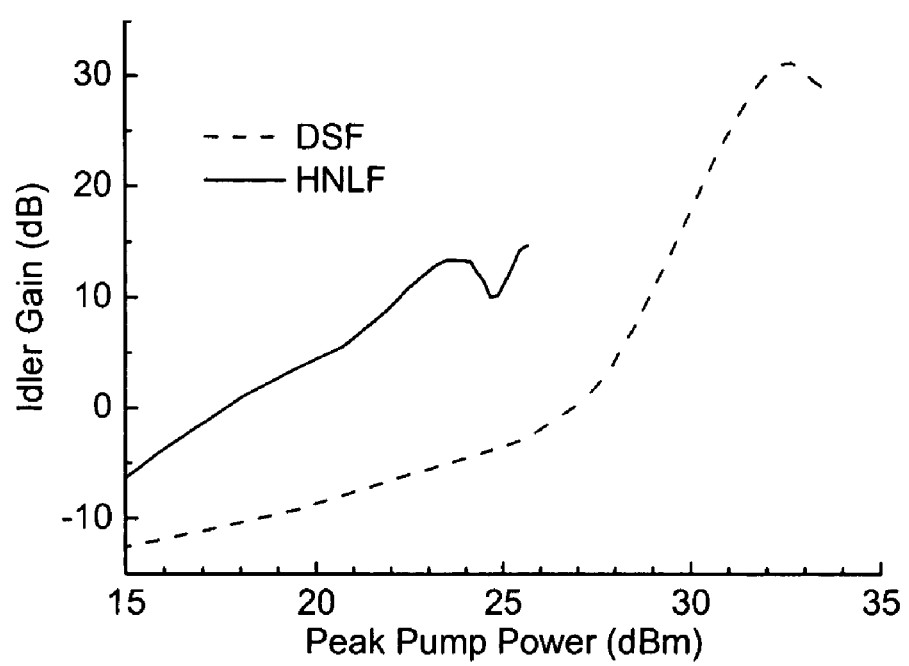
FIG. 11 shows the transfer function of the parametric fiber amplifier with regular dispersion shifted fiber (dashed line) and the highly nonlinear fiber (solid line).

FIG. 11 shows the experimentally measured transfer function of the FPA using a HNLF in terms of the idler gain vs. the peak pump (the data signal to be regenerated) power. As a comparison, the transfer function of the FPA using a regular dispersion-shifted fiber (DSF) is shown in the same figure. The idler obtains exponential amplification at lower pump (the bit 0's) and flattened gain at a higher pump (the bit 1's) as result of pump energy transferring to other frequency components via self-phase modulation induced spectral broadening and supercontinuum generation. Since the nonlinear coefficient γ has been enhanced from approximately 2.7 $W^{-1}km^{-1}$ to approximately 9.75 $W^{-1}km^{-1}$ for the HNLF, the power required for flattened gain is greatly decreased from approximately 32.5 dBm to approximately 23.5 dBm. In addition, due to the small dispersion slope, the FPA gain-flattened range (within approximately 0.5 dB fluctuation for example) is also increased from approximately 0.6 dB to approximately 1 dB.

At the output of the SOA, the approximately 10 Gb/s PRBS data to be regenerated has reduced extinction ratio due to saturated amplification of the SOA. The ASE noise of the SOA adds noise at both bit 0's and bit 1's. Due to the finite gain recovery time of the SOA, bit 1's also exhibit serious pattern effects.

Figure 12:
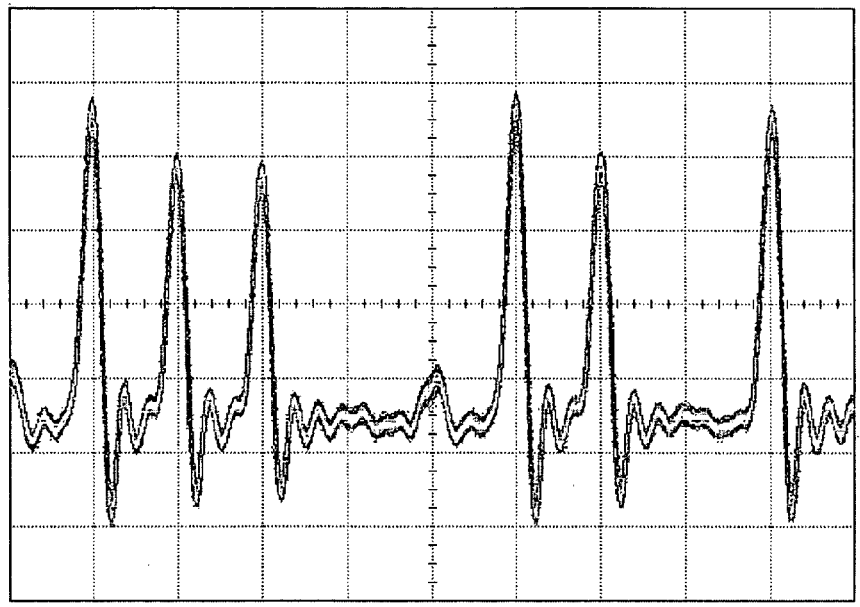
FIG. 12a shows the data pattern of the input data.
FIG. 12b shows the eye diagram of the input data.
FIG. 12c shows the data pattern of the regenerated data of the preceding figures.
FIG. 12d shows the eye diagram of the regenerated data.
Figure 12:
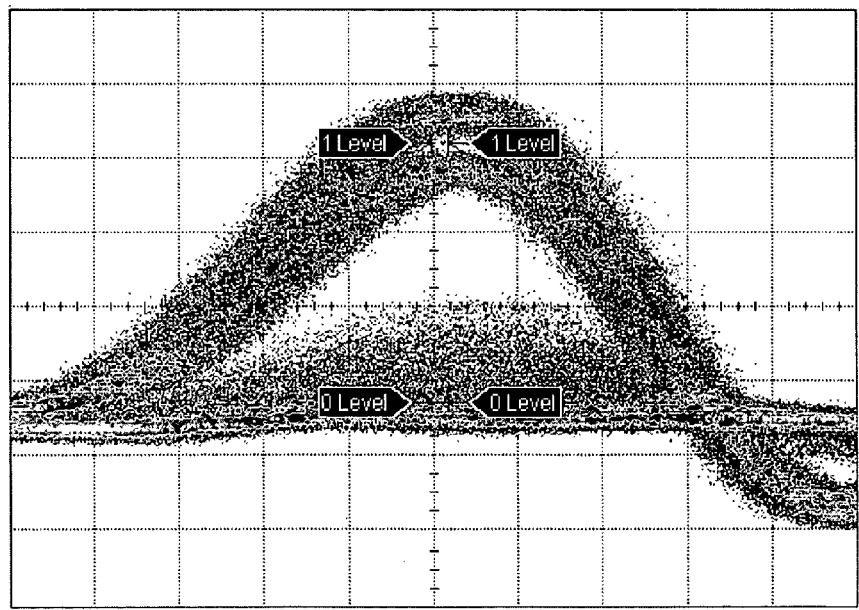
Figure 12:
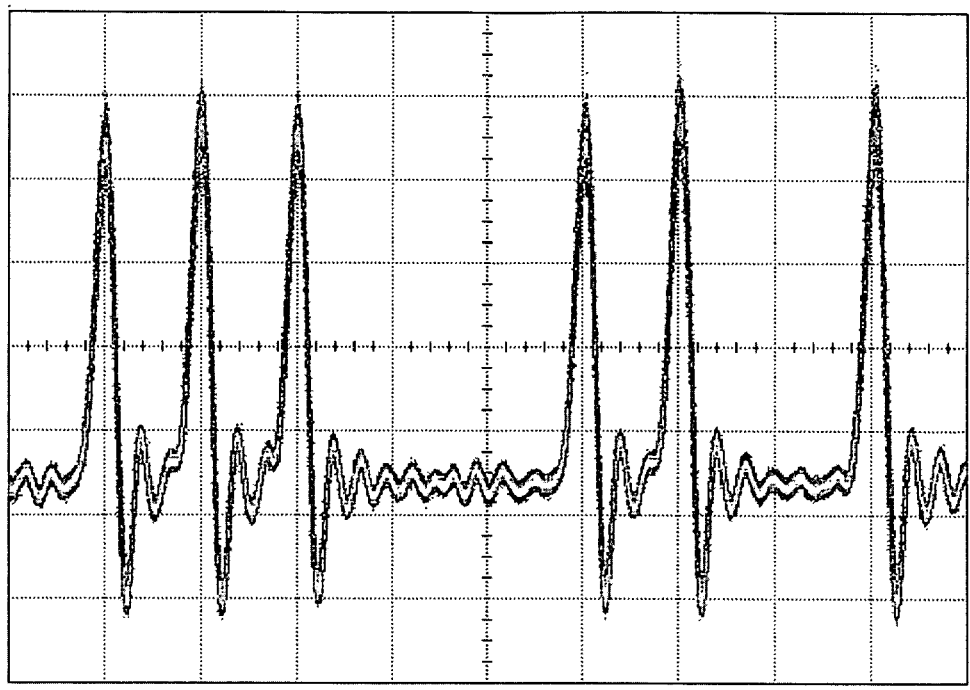
Figure 12:
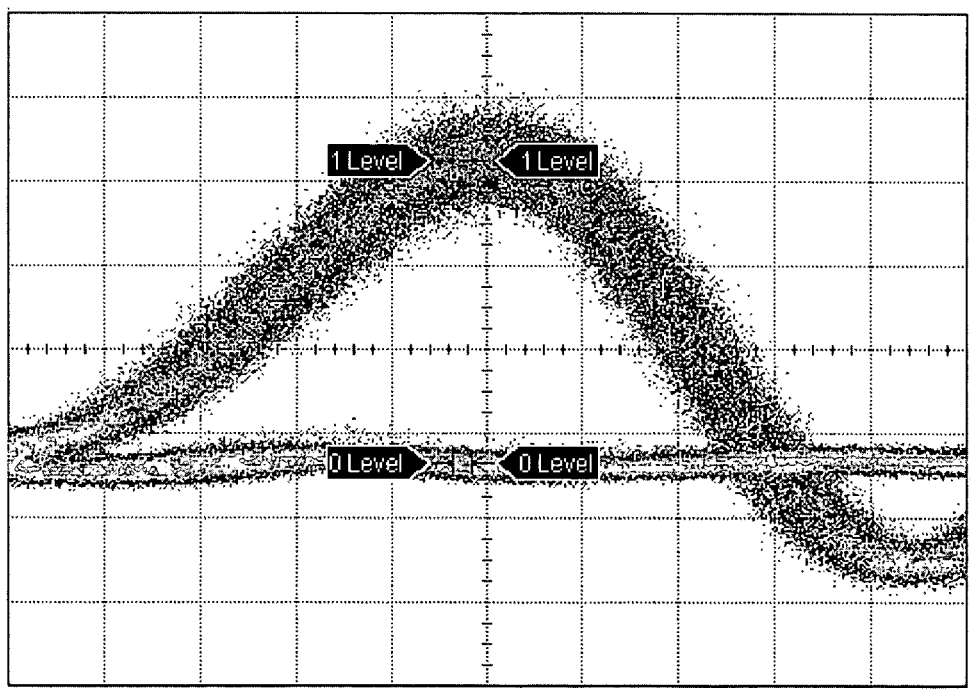

FIGS. 12a and 12b show the data to be regenerated into the FPA and the corresponding eye diagram in amplitude vs. time. It should be pointed, although the extinction ratio is moderate (approximately 9 dB measured from DCA oscilloscope), the eye opening is quite small due to the noises on both bit 0's and 1's. In addition, pattern effect on bit 1's is apparent from the "double eye" in the eye diagram. The regenerated data and the corresponding eye diagram are shown in FIGS. 12c and 12d respectively. One could notice that after the regeneration, both the noises of bit 0's and bit 1's have been reduced. As a result, the eye diagram was widely opened and the amplitude of the pulses (bit 1's) became uniform. The corresponding extinction ratio is approximately 14 dB, which is already close to the highest extinction ratio measurable using the oscilloscope.

Figure 13:
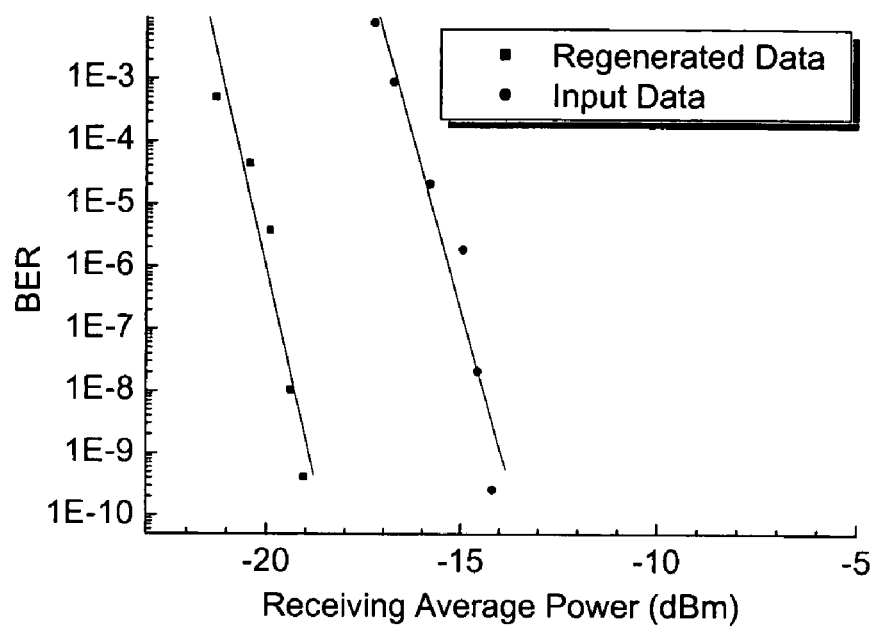
FIG. 13 shows the BER measurements of the approximately 10 Gb/s input signal and regenerated data respectively.

To ensure end-to-end system performance, a measurement of the sensitivity of the original data and the regenerated data was made and presented herein. The regeneration scheme indeed provides negative power penalty. FIG. 13 shows that at a BER of approximately $10^{-9}$, the receiver sensitivity of the regenerated data has been improved to approximately −19 dBm compared to approximately −14 dBm of the original degraded signal. Thus the regenerated data has an approximately 5 dB negative power penalty. This represents one of the best negative power penalties reported so far in literature.

Thus, a 2R regeneration using a fiber parametric amplifier has been successfully demonstrated. An extinction ratio enhancement of approximately 5 dB has been obtained. Negative power penalty as much as approximately 5 dB indicates its attractive end-to-end transmission performance.

The experimental results demonstrated above uses input signal with extinction ratio degradation but no jitter degradation. For signals with jitter degradation, a 3R regenerator will be used where the excess jitter is removed by the clock recovery process. In this case negative power penalty of the 3R regeneration process will result from not only reshaping as in the 2R case but also retiming.

Further improvement of the presentation can be made by use other material systems with high effective third-order nonlinear coefficients rather than optical fiber for parametric amplification. These materials can include bulk nonlinear optical crystals or semiconductors. By increasing the nonlinear optical coefficients, the regenerator can be made much more compact. In particular, self-phase modulation and parametric amplification using cascaded nonlinear optical processes in periodically-poled lithium niobate is of special interest as its effective nonlinear coefficient is approximately 4 orders of magnitude higher than that of optical fiber. So the kilometers of fiber used in the experiments described above as be replaced by a few centimeters of periodically-poled lithium niobate.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of optical regeneration comprising in combination the steps of:
   exponentially amplifying a degraded input signal with a piece of fiber with parametric amplification; and
   providing gain saturation to the exponentially amplified signal to form a regenerated output signal.

2. The method of claim 1, wherein the steps of exponentially amplifying and gain saturation are provided by two independent devices.

3. The method of claim 1, wherein the steps of exponentially amplifying and gain saturation are provided by a single device.

4. The method of claim 1, wherein the exponential amplification is provided by one of a dispersion shifted fiber and a photonic crystal fiber with parametric amplification.

5. The method of claim 1, wherein the gain saturation is provided by a semiconductor optical amplifier.

6. The method of claim 1, wherein the gain saturation is provided by self-phase modulation induced supercontinum generation of the input data used as a pump.

7. An apparatus for optical regeneration of degraded data, comprising:
   a parametric amplifier pumped by input data; and
   a continuous wave (CW) laser as the probe for the parametric amplifier;
   a saturation amplifier for receiving output from the parametric amplifier, wherein
   a regenerated output signal is generated, wherein the polarization of the CW laser is linear and aligned to have maximal overlap with polarization of the input data and the power of the CW laser is controlled so that the power of regenerated data is independent of the state of polarization of the input data.

8. The apparatus of claim 7, wherein the input signal is a non return-to-zero (NRZ.

9. The apparatus of claim 7, wherein the input signal is a return-to-zero (RZ.

10. The apparatus of claim 7, wherein the polarization of the CW laser is aligned with polarization of the input data.

11. The apparatus of claim 7, wherein the parametric amplifier is an optical fiber with its zero-dispersion wavelength optimized for parametric amplification, which should be approximately the same as that of the wavelength of the input signal and the saturation amplifier is a semiconductor optical amplifier.

12. The apparatus of claim 11, wherein the fiber is a photonic crystal fiber.

13. The apparatus of claim 11, wherein the parametric amplification medium is a third nonlinear optical crystals.

14. The apparatus of claim 11, wherein the parametric amplification medium is a second-order nonlinear optical crystals used cascading third-order nonlinear optical material.

15. An apparatus for optical regeneration comprising:
   a pulsed light source, wherein the polarization of the pulsed light source is linear;
   an optical fiber parametric amplifier; and
   a saturation amplifier wherein input data is used as the pump for the optical fiber parametric amplifier and output of the parametric amplifier is input into the saturation amplifier.

16. The apparatus of claim 15, wherein the pulsed light source is generated from:
   a clock signal recovered from the input data.

17. The apparatus of claim 15, wherein the input signal is a NRZ signal.

18. The apparatus of claim 15, wherein the input signal is a RZ signal.

19. The apparatus of claim 15, wherein the parametric amplifier is an optical fiber with its zero-dispersion wavelength optimized for parametric amplification, which should be approximately the same as that of the wavelength of the input signal and the saturation amplifier is a semiconductor optical amplifier.

20. The apparatus of claim 19, wherein the fiber is a photonic crystal fiber.

21. The apparatus of claim 20, wherein the parametric amplification medium is a third nonlinear optical crystals.

22. The apparatus of claim 20, wherein the parametric amplification medium is a second-order nonlinear optical crystals used cascading third-order nonlinear optical material.

23. The apparatus of claim 19, wherein the polarization of the pulsed light source is aligned with polarization of the input data.

24. The apparatus of claim 19, wherein the polarization of the pulsed light source is linear and aligned to have maximal overlap with polarization of the input data, and the power of the pulsed laser is controlled so that the power regenerated data is independent of the state of polarization of the input data.

25. An apparatus for optical regeneration comprising:
a CW laser; and
a fiber with parametric amplification as an exponential amplifier operating in a saturation state, wherein input data is used as a pump for the exponential amplifier.

26. The apparatus of claim 25, wherein the input signal is a NRZ signal.

27. The apparatus of claim 25, wherein the input signal is a RZ signal.

28. The apparatus of claim 25, wherein the parametric amplifier is an optical fiber with its zero-dispersion wavelength optimized for parametric amplification, which should be approximately the same as that of the wavelength of the input signal and the saturation amplifier is a semiconductor optical amplifier.

29. The apparatus of claim 25, wherein the polarization of the CW laser is aligned with polarization of the input data.

30. The apparatus of claim 25, wherein the polarization of the CW laser is linear and aligned to have maximal overlap with polarization of the input data, and the power of the CW laser is controlled so that the power regenerated data is independent of the state of polarization of the input data.

31. The apparatus of claim 25, wherein the fiber is a photonic crystal fiber.

32. The apparatus of claim 25, wherein the parametric amplification medium is a third nonlinear optical crystals.

33. The apparatus of claim 25 wherein the parametric amplification medium is a second-order nonlinear optical crystals used cascading third-order nonlinear optical material.

34. An apparatus for optical regeneration comprising:
a pulsed laser source, wherein the polarization of the pulsed light source is linear;
a parametric amplifier; and
a saturation amplifier wherein input data is used as the pump for the parametric amplifier and output of the parametric amplifier is input into the saturation amplifier.

35. The apparatus of claim 34, wherein the pulsed laser source is generated from:
a clock signal recovered from the input data.

36. The apparatus of claim 34, wherein the input signal is a NRZ signal.

37. The apparatus of claim 34 wherein the input signal is a RZ signal.

38. The apparatus of claim 34 wherein the parametric amplifier is an optical fiber with its zero-dispersion wavelength optimized for parametric amplification, which should be approximately the same as that of the wavelength of the input signal and the saturation amplifier is a semiconductor optical amplifier.

39. The apparatus of claim 38 wherein the fiber is a photonic crystal fiber.

40. The apparatus of claim 39 wherein the parametric amplification medium is a third nonlinear optical crystals.

41. The apparatus of claim 39 wherein the parametric amplification medium is a second-order nonlinear optical crystals used cascading third-order nonlinear optical material.

42. The apparatus of claim 34, wherein the polarization of the pulsed laser source is aligned with polarization of the input data.

43. The apparatus of claim 34 wherein the polarization of the pulsed laser source is linear and aligned to have maximal overlap with polarization of the input data, and the power of the pulsed laser source is controlled so that the power regenerated data is independent of the state of polarization of the input data.

44. An apparatus for optical regeneration comprising:
a pulsed laser source; and
a saturating parametric amplifier, wherein input data is used as a pump for the saturating parametric amplifier and the polarization of the pulsed laser source is linear and aligned to have maximal overlap with polarization of the input data, and the power of the pulsed laser source is controlled so that the power regenerated data is independent of the state of polarization of the input data.

45. The apparatus of claim 44, wherein the input signal is a NRZ signal.

46. The apparatus of claim 44 wherein the input signal is a RZ signal.

47. The apparatus of claim 44 wherein the parametric amplifier is an optical fiber with its zero-dispersion wavelength optimized for parametric amplification, which should be approximately the same as that of the wavelength of the input signal and the saturation amplifier is a semiconductor optical amplifier.

48. The apparatus of claim 44 wherein the polarization of the pulsed laser source is aligned with polarization of the input data.

* * * * *